June 28, 1960 N. W. FELDMAN 2,943,272

CROSSTALK CANCELLATION IN SIGNAL COMMUNICATION SYSTEM

Filed Jan. 2, 1958 2 Sheets-Sheet 1

INVENTOR,
NATHAN W. FELDMAN

BY

Harry M. Saragovitz
ATTORNEY.

INVENTOR,
NATHAN W. FELDMAN
BY
Harry M. Saragovitz
ATTORNEY.

United States Patent Office 2,943,272
Patented June 28, 1960

2,943,272

CROSSTALK CANCELLATION IN SIGNAL COMMUNICATION SYSTEM

Nathan W. Feldman, 446 Long Branch Ave., Long Branch, N.J.

Filed Jan. 2, 1958, Ser. No. 706,881

3 Claims. (Cl. 333—1)

Figure 1:
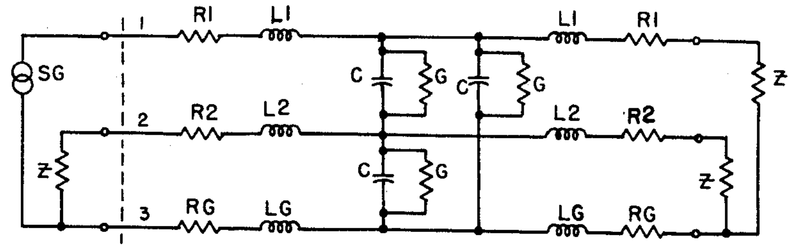

(Granted under Title 35, U.S. Code (1952), sec. 266)

The invention described herein may be manufactured and used by or for the Government for governmental purposes, without the payment of any royalty thereon.

The invention relates to signal communication systems employing multiconductor cables for transmitting the communication signals, and particularly to arrangements for reducing crosstalk interference in such systems.

It is more specifically directed to, although not limited to, such systems employing cables in which the transmission conductors are relatively short, for example, those used in the intra-central office switching equipment of a voice frequency telephone system. The primary function of a conductor in such a cable is to provide efficient transmission of useful signals thereover between certain points with a minimum of signal distortion. Such useful signal transmission is often adversely affected by interference from unwanted signals simultaneously transmitted over the same conductor, which unwanted signals may be picked up by the conductor from external sources for example, other transmission conductors in the same cable carrying other useful signals or the transmission conductors of other adjacent signal transmission systems, as a result of capactive, magnetic and resistive couplings between the first conductor and the external sources. These unwanted signals are usually referred to by the general term "crosstalk."

When the cable conductors carrying the useful signals are long, say considerably over 500 feet in length, the amount of crosstalk generated therein may be so large as to interfere with useful signal transmission over the cable conductors to an extent which would be considered intolerable in a high quality signal communication system. In such systems, therefore, balanced cable circuits as well as other remedial measures, such as the connection of capacitors, inductors or other elements between the conductors in the cable, are often employed to balance out the crosstalk to the necessary extent. When the cable conductors are relatively short, say less than 500 feet in length, the amount of generated crosstalk is substantially smaller although still sufficient to require considerable reduction to enable satisfactory useful signal transmission. This invention is primarily concerned with such short communication cables, although it may be used to advantage for aiding in the reduction of crosstalk interference in any communication system utilizing unbalanced cables of any length.

In the past, substantially all multi-conductor cables in a voice frequency telephone system, including the shorter cables utilized for inter-chassis wiring of telephone switchboards, have been designed on a balanced cable basis. The primary reason for avoiding unbalanced cable circuits has been the anticipated generation of such a large amount of crosstalk that ordinary crosstalk prevention measures applied to the unbalanced cable circuits would not be sufficiently effective. The price paid for the reduction of crosstalk by the use of balanced cable circuits is an additional conductor for each signal transmission circuit, as well as more complicated and expensive contact systems for the switches in the case of switchboard cabling. Because of the many advantages which would be obtained with unbalanced cable circuitry including the major one which is the resulting saving in copper estimated as close to 50 percent, a complete investigation was made by the applicant of the crosstalk problems which would be involved with such circuitry. This investigation included a mathematical analysis of an unbalanced multiconductor cable system, a study of the effects of changes in cable parameters, an evaluation of the relative contributions of the different crosstalk producing mechanisms in such a system, measurement of cable parameters and tests of actual systems using different types of cable to check the results obtainable with different crosstalk reducing expedients.

A general object of the invention is to reduce crosstalk interference in signal communication systems using multiconductor cables for transmitting the communication signals.

A related object is to reduce crosstalk interference in the signal transmission conductors of unbalanced cable transmission circuits in a signal communication system, for example, a voice frequency telephone system, to a tolerable amount.

A more specific object is to reduce crosstalk interference in a voice frequency telephone system employing unbalanced multi-conductor cable circuitry, contributed by the magnetic and resistive couplings between the signal conductors in the cable.

These objects are attained in accordance with the invention by the use in the common ground return conductor of the unbalanced cable system of a negative impedance device of such nature and value as to effectively cancel out the magnetic and resistive crosstalk-producing parameters of the cable conductors.

Figure 6:
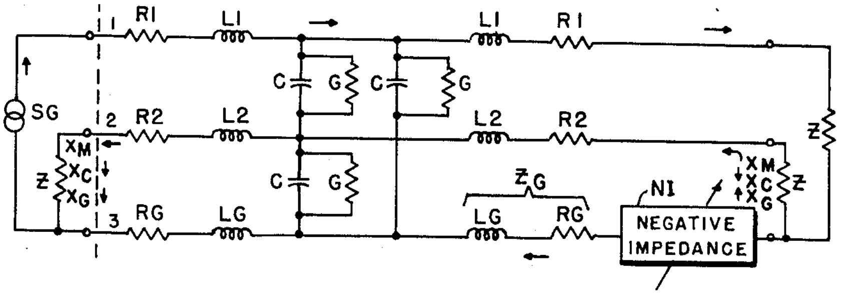

The various objects and features of the invention will be better understood from the following detailed description thereof when read in conjunction with the various figures of the accompanying drawings in which:

Figs. 1, 2, 3, 3A, 4 and 5 respectively show simplified equivalent circuits for all or a portion of an unbalanced multi-conductor cable system used in a signal communication system with associated representations of the capacitive, magnetic or common ground return coupling mechanisms, or all of such coupling mechanisms, contributing to the generation of crosstalk;

Figs. 2A, 3B, 4A and 5A show curves indicating the variation with load impedance of the crosstalk voltage ratio of the signal in the load of a disturbed signal conductor to the signal in the load of a disturbing signal conductor in an unbalanced multi-conductor cable circuit of a voice frequency telephone system, plotted from computed cable parameters, resulting from capacitive, magnetic or common ground return coupling between the cable conductors, or all of such couplings, respectively;

Fig. 6 shows in block diagrammatic form an unbalanced three-conductor cable system with associated means in accordance with the invention for reducing the effects of the magnetic and resistive interconductor cable parameters which contribute to crosstalk generation.

By definition, crosstalk is the phenomenon whereby signals transmitted over one circuit or channel of a signal transmission system are detectable in another circuit or channel in the same or another signal transmission system. This definition implies that when crosstalk from one circuit appears in another circuit some sort of energy transfer coupling exists between the two circuits. The major factors contributing to crosstalk generation in such an unbalanced cable system are: (*a*) capacitive coupling; (*b*) magnetic coupling; and (*c*) ground return coupling, each of these factors being discussed more fully in connection with the various figures of the drawing respectively illustrating them.

Fig. 1 shows a single section of the equivalent electrical circuit of an unbalanced three-conductor cable system. The comments made below in connection with the three-conductor cable of this system apply equally well to cable employing a larger number of transmission conductors. In the cable of Fig. 1, the conductor designated 1 will be considered as the disturbing conductor and as being connected to a signal generator SG, for example, to a telephone message producing circuit of a voice frequency telephone system, and the conductor 2 as the disturbed conductor into which crosstalk is coupled. The conductor designated 3 is the ground conductor common to all signal carrying circuits. The conductors 1 and 2 feed into separate loads of equivalent impedance Z. The resistance and inductance in conductor 1 is represented by the resistance elements R1 and the inductance elements L1 in series; in conductor 2 by the resistance elements R2 and the inductance elements L2 in series; and in the common ground return conductor 3 by the resistance elements RG and the inductance elements LG in series. Crosstalk will be developed in conductor 2 by coupling from conductor 1. This crosstalk may take all of three coupling paths: (*a*) capacitive coupling between conductors 1 and 2; (*b*) magnetic or transformer coupling between conductors 1 and 2 because of the overlapping magnetic fields of the inductance elements in these circuits; and (*c*) the common ground follower action of conductor 3.

The coupling mechanisms that are most readily apparent are the ones involving the inter-conductor capacitance and conductance represented in Fig. 1 by the capacitor C and the resistance G in shunt therewith, respectively, in the networks shown coupling the conductors 1 and 2, the conductors 2 and 3 and the conductors 1 and 3, respectively. This capacitance C and conductance G, which join the disturbing conductor 1 to the disturbed conductor 2, act as a portion of a voltage divider, the loads Z between each end of the disturbed conductor 2 and the common ground conductor 3 forming the other portion of this voltage divider.

Figure 2:
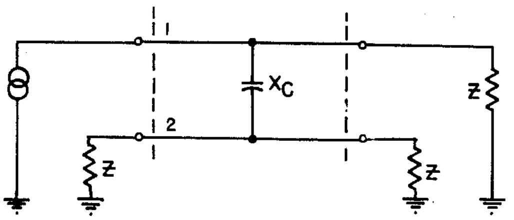
Figure 2A:
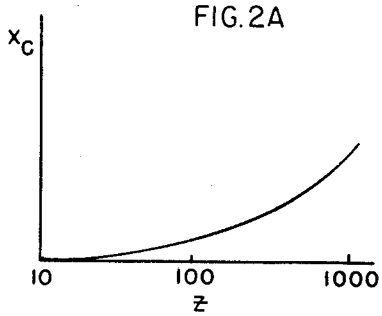
Figure 3:
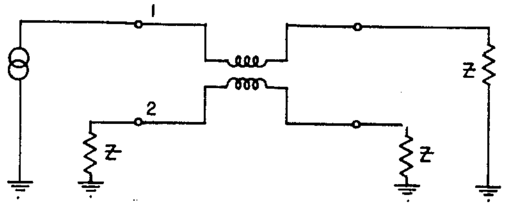
Figure 3B:
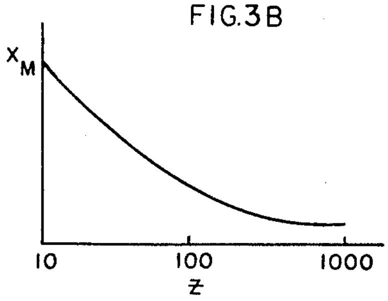
Figure 3A:
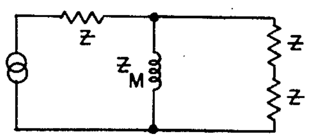

Fig. 2 shows the equivalent circuit of the crosstalk that is capacitively coupled between the disturbing conductor 1 and the disturbed conductor 2 (completely ignoring all other coupling effects including the conductance element G and the capacitive coupling between the disturbed conductor and the ground return conductor because of their negligible contribution to the amount of crosstalk). Analysis of this equivalent circuit indicates that the crosstalk voltage ratio $X_c$ of the signal in the load of the disturbed conductor 2 to the signal in the load of the disturbing conductor 1, due to the capacitive coupling between these conductors is given by the following equation:

$$X_C=\frac{Z}{2\left(Z_C+\frac{Z}{2}\right)} \longrightarrow \frac{Z}{2Z_C} \quad (1)$$

(Z in denominator being negligible)

The next coupling mechanism to be considered is that involving magnetic coupling. This coupling effect due to the overlapping of the magnetic fields of the inductances in the disturbing and disturbed conductors may be considered a transformer coupling having a one-to-one turns ratio, in which the inductance in the disturbing conductor is the primary winding and the inductance in the disturbed conductor the secondary winding, as shown in the equivalent circuit of Fig. 3 (ignoring all other coupling effects). To enable easy evaluation, this equivalent circuit may be simplified to the form shown in Fig. 3A, which is the equivalent circuit of a transformer. In the latter circuit, the three load impedances Z are shown connected in the series across the signal generator SG and the mutual impedance $Z_M$ of the transformer is shunted across two of these impedances and in series with the third load impedance across the signal generator SG. The crosstalk voltage ratio $X_M$ of the signal in the load of the disturbed conductor 2 to the signal in the load of the disturbing conductor 1 resulting from this magnetic or transformer coupling is:

$$X_M=\frac{Z_M}{2\left(\frac{2Z_MZ}{Z_M+Z}+Z\right)} \longrightarrow \frac{Z_M}{2Z} \quad (2)$$

($Z_M$ in denominator being negligible)

Figure 4:
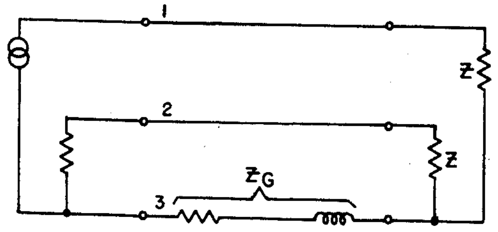
Figure 4A:
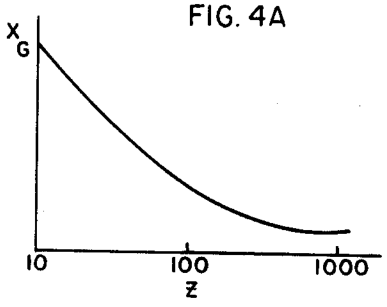

The third coupling mechanism is the one resulting from the common impedance in the common ground return conductor 3 for the signals transmitted over the circuit including conductors 1 and 2. As shown in Fig. 1, the loads Z connected to opposite ends of the disturbed conductor 2 are in series with each other and shunted across the resistance and the inductance in series in the ground return conductor 3. The voltage generated as a result of current flow in the impedance of the common ground conductor 3 is equally divided between the two loads and follows Ohm's law. Fig. 4 shows the equivalent circuit for the crosstalk that is common ground return coupled only. If this circuit is treated as a simple voltage divider, the crosstalk voltage ratio $X_G$ of the signal in the load of the disturbed conductor 2 with respect to the signal in the load of the disturbing conductor 1 is:

$$X_G=\frac{Z_G}{2\left(\frac{2Z_GZ}{Z_G+2Z}+Z\right)} \longrightarrow \frac{Z_G}{2Z} \quad (3)$$

($Z_G$ in denominator being negligible)

Figure 5:
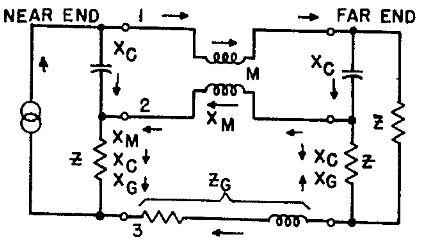
Figure 5A:
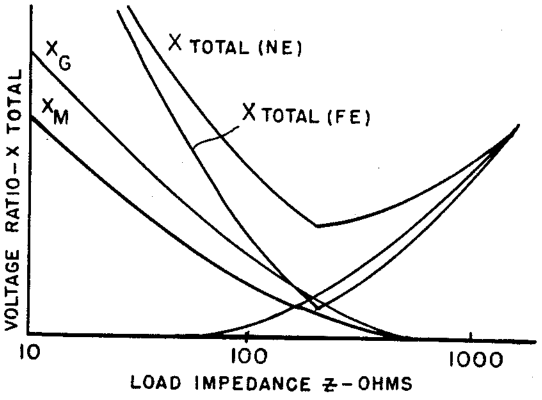

Each of the three crosstalk coupling mechanisms have been evaluated in turns of transmission line parameters and circuit impedances, and it is now necessary to add them to get the total crosstalk figure. The assumption that each can be treated individually will cause an error of less than one percent. The equivalent circuit of Fig. 5 shows all of the three coupling mechanisms individually illustrated in Figs. 2, 3 and 4. In this equivalent circuit, the labeled arrows indicate the direction of the currents resulting from the three coupling mechanisms. Combining them is a simple problem in vector addition. The crosstalk voltage ratio $X_{total}$ resulting from all of these couplings of the signal in the load of the disturbed conductor 2 with respect to the signal in the load of the disturbing conductor 1 is:

$$X_{total}=\pm X_C+X_M+X_G$$
$$=\pm\frac{Z}{2Z_C}+\frac{Z_M}{2Z}+\frac{Z_G}{2Z} \text{ (Vectorial Sum)} \quad (4)$$

(In this equation, the plus (+) sign for the first term should be used to obtain the near-end crosstalk and the minus (−) sign to obtain far-end crosstalk)

By inspection, it is seen that the crosstalk $X_{NE}$ occurring at the generator end (near-end) of the cable is different from the crosstalk $X_{FE}$ occurring at the loaded end (far-end) of the cable. The crosstalk $X_{NE}$ is equal to the vectorial sum of the three crosstalk components or $$X_{NE}=X_C+X_M+X_G \quad (5)$$

The far-end crosstalk $X_{FE}$ is equal to the sum of the magnetic coupling crosstalk and the common ground return crosstalk coupling minus the capacitance coupling crosstalk or $$X_{FE}=X_M+X_B+X_C \quad (6)$$

On the basis of the foregoing analysis, it may be seen that crosstalk is a function of the circuit impedance and the transmission line parameters. The theory shows that for any given line (conductor), the crosstalk will be a minimum at some specific circuit impedance. To compute this value:

$$\text{if } Z_{\text{Tot.}} = f(Z_C, Z_M, Z_G)Z,$$

$$\text{find } \frac{dX_{\text{Tot.}}}{dZ} \text{ and set it equal to zero}$$

Then, treating $Z_C$, $Z_M$ and $Z_G$ as constants, solve for Z.

At this value of Z, the crosstalk would be a minimum. To prove this point empirically, a 26-pair cable 100 feet long and a spiral-4 cable 124 feet long were tested in the laboratory. The test procedure involved (*a*) measuring the cable parameters; (*b*) measuring the crosstalk; and (*c*) calculating the crosstalk. The crosstalk of items (*b*) and (*c*) above were determined at a frequency of 1000 cycles and for a load impedance of 10 ohms, 100 ohms and 1000 ohms. The measured values were used to compute the "X" versus "Z" curves shown in Figs. 2A, 3B, 4A and 5A. Each cable was connected up in a circuit such as shown in the Figs. 1, 2, 3, 4 and 5 and the computed values checked by measurements. To simplify the measurement and calculations $Z_G$ may be set equal to zero and the experiments made accordingly:

$$X_{\text{Tot.}} = \frac{Z_M}{2Z} + \frac{Z}{2Z_C}$$

$$\frac{dX}{dZ} = \frac{-Z_M}{2Z^2} + \frac{1}{2Z_C} = 0$$

$$Z_{\text{opt}} = \sqrt{Z_M Z_C} = \sqrt{\frac{\omega M}{\omega C}} = \sqrt{\frac{M}{C}} \qquad (7)$$

where M is the mutual inductance in henries and C is the capacitance between the disturbing and disturbed conductors in farads.

Under optimum conditions, the minimum crosstalk would be $$X_{\text{Tot-min.}} = \frac{Z_M}{2\sqrt{Z_M Z_C}} + \frac{\sqrt{Z_M Z_C}}{2Z_C} = \sqrt{\frac{Z_M}{Z_C}} = \sqrt{MC^2} \qquad (8)$$

From this, it may be deduced that crosstalk generation would be at a minimum if the circuit impedance is equal to the characteristic impedance; also, that this minimum crosstalk would be equal to the reciprocal of the propagation velocity of the cable.

The conclusions arrived at in the investigation may be summarized as follows:

(1) Crosstalk is coupled by the following three mechanisms:

(*a*) Capacitive coupling:

$$\left(X_C = \frac{Z}{2Z_C}\right)$$

(*b*) Magnetic coupling:

$$\left(X_M = \frac{Z_M}{2Z}\right)$$

(*c*) Common ground return coupling:

$$\left(X_G = \frac{Z_G}{2Z}\right)$$

(2) Near-end and far-end crosstalk are different.

(3) Near-end crosstalk is the vector sum of the three components listed under (1).

(4) Far-end crosstalk is the vector difference between the capacitive component and the other two components in Equation (6).

(5) Crosstalk can be reduced by designing the cable parameters as follows:

(*a*) Reduce conductor resistance (R).

(*b*) Reduce conductor inductance (L).

(*c*) Reduce inter-conductor capacitance (C).

(6) With a given cable, the crosstalk can be minimized by optimizing the circuit nominal impedance Z.

Consider the equivalent circuit showing all the crosstalk coupling mechanisms in Fig. 5, and Equation (4) for $X_{\text{Tot.}}$. It is apparent from Fig. 5 that the impedances $Z_M$ and $Z_G$ are in series with each other and will aid each other in generating crosstalk, and that if an element were added to this series circuit which would effectively reduce $Z_M$ and $Z_G$ to zero, such as an equivalent negative impedance, then their contributions to the total amount of crosstalk would disappear. This may be expressed mathematically by adding a term, $R_G/2Z$, to the Equation (4) such that $$\frac{Z_M}{2Z} + \frac{Z_G}{2Z} + \frac{R_G}{2Z} = 0$$

or $$R_G = -(Z_M + Z_G) \qquad (9)$$

which is the negative impedance component required in the series circuit of Fig. 5 defined above to cancel effectively $Z_M$ and $Z_G$.

The term "positive impedance" is usually applied to an impedance having a resistance component which is positive and a reactance component which may be positive or negative. A "negative impedance," on the other hand, includes a negative resistance component and a reactance component which may be negative or positive. The negative impedance corresponding to a given positive impedance is one in which each component is of equal magnitude but opposite in sign to the corresponding component of the positive impedance (resistance, inductance or capacitance).

There are a number of different types of circuit arrangements known in the prior art for obtaining an impedance which is the negative at all frequencies of any positive impedance network which may be constructed physically. For example, the U.S. Patent to Mathes, No. 1,779,382, issued October 21, 1930, discloses for this purpose (Fig. 1) an amplifier having two resistance-coupled, three-electrode vacuum tube stages with the input of the first stage tube short-circuited, and a feedback impedance coupling between the output of the second stage tube and the input of the first stage tube, which includes a network of positive impedance elements, the negative of which is to be obtained, having a ratio to the desired elements determined solely by choice of the various constants of the amplifier circuit; and (Fig. 2) a single three-electrode vacuum tube amplifier with a negative feedback coupling between its output and input including the same network of positive impedance elements and a transformer for producing the desired 180° phase shift of the feedback voltage obtained by the second stage tube in the first amplifier circuit. The U.S. patents to Dudley 1,779,380, issued October 21, 1930; Crisson 1,776,310, issued September 23, 1930; Merrill 2,582,498, issued January 15, 1952 and Koenig 2,662,123, issued December 8, 1953 disclose series or shunt type, or combinations of series and shunt types of negative impedance repeaters which may be used for obtaining the negative of a positive impedance network.

In accordance with the invention, a block NI of negative impedance ($R_G$) containing negative resistance and negative inductance of proper value would be inserted in the common ground conductor 3 of an unbalanced multi-conductor cable system represented by the equivalent circuit of Fig. 6, and would serve on a compromise basis to cancel effectively the magnetic and resistive parameters ($X_M$ and $X_G$) contributing to the regeneration of crosstalk in all of the signal transmitting conductors of the cable. The negative impedance element NI used for this purpose may be of any of the well-known types, for example, any one of those disclosed in the aforementioned patents. This negative impedance could, quite conceivably, cancel up to 90 percent of the $Z_M$ and $Z_G$ crosstalk components which would result in a reduction of the total crosstalk up to about 15 decibels. This negative impedance when once adjusted to a suitable compromise value would require no further attention. If the cable was changed or disturbed, then its adjustment could be trimmed for best performance, although under most conditions of use of the unbalanced cable system in practice, such trimming would probably be unnecessary.

Although the crosstalk cancellation arrangement of the invention has been described and illustrated as applied to a multi-conductor cable in which the signal conductors transmit in only one direction, it is to be understood that it may be applied in similar manner also to the cables containing conductors transmitting signals in both directions in a two-way signal communication system. Various other modifications of the crosstalk cancellation arrangement as described above and illustrated in the drawings which would be within the spirit and scope of the invention will occur to persons skilled in the art.

What is claimed is:

1. In a signal communication system: sources of different communication signals; a plurality of signal receiving means; a cable containing a plurality of individual, like transmission conductors, each having resistive and inductive parameters, connected in unbalanced circuit relation between said sources and said receiving means to provide therebetween a plurality of two-wire transmission circuits in which certain of said conductors respectively serve for transmitting different, useful signals from a separate source to a separate signal receiving means and another of said conductors serves as a common signal return conductor for all of the two-wire circuits formed with said certain conductors; and means to reduce crosstalk interference in each of said certain conductors as a result of useful signal transmission over one or more of the other certain conductors comprising a network inserted in said signal return conductor providing in series therewith an inductive impedance substantially equal in value but opposite in sign to the average mutual impedance of the effective inductive coupling between any two of said certain conductors and another impedance having resistive and inductive components substantially equal in value but opposite in sign to those of the common impedance in said signal return conductor, for effectively canceling the magnetic and resistive parameters of all of said certain conductors.

2. In combination in a signal communication system: sources of different communication signals; a plurality of load circuits; a cable connecting said sources to said load circuits, containing a plurality of individual, like transmission conductors each having resistive and inductive parameters, connected at their input and output ends to a separate one of said sources and a separate load circuit, respectively, in unbalanced circuit relationship to provide a plurality of two-wire transmission circuits therebetween in which certain of said conductors respectively serve for transmitting different, useful signals from the source to the load circuit connected thereto and another of said conductors serves as a common signal return conductor for all of said two-wire circuits, the crosstalk generated in each of said certain conductors when useful signal transmission is taking place over one or more others of said certain conductors having a magnetic component which is a function of the ratio of the average mutual impedance of the effective inductive couplings between that conductor and each of the other certain conductors, to twice the characteristic impedance of each of said conductors in the cable, and another component which is a function of the ratio of the common impedance in said signal return conductor to twice the characteristic impedance of each cable conductor; and means for reducing crosstalk interference in said system comprising a network inserted in said signal return conductor which provides in series therewith an inductive impedance substantially equivalent in value and opposite in sign to said mutual impedance and another impedance having resistive and inductive components which are substantially equivalent in value and opposite in sign to those of the common impedance in said signal return conductor.

3. In combination in a signal communication system: sources of different communication signals at one point in the system; a plurality of signal receiving means at another point therein; a cable extending between said one and said other point, containing a plurality of individual, like transmission conductors, each having resistive and inductive parameters, said conductors being in relatively close proximity to each other throughout the length of the cable and being connected at their input and output ends to a separate one of said sources and to a separate signal receiving means, respectively, in unbalanced circuit relationship to provide therebetween a plurality of two-wire transmission circuits in which certain of said conductors respectively serve to transmit different useful signals from the source to the signal receiving means connected thereto and another of said conductors serves as a common signal return conductor for all of said two-wire circuits, the crosstalk generated in each of said certain conductors as a result of signal transmission over one or more of the others of said certain conductors including a magnetic component substantially equal to $Z_M/2Z$ and another component substantially equal to $Z_G/2Z$ which are effectively in series with each other in said system, where $Z$ is the characteristic impedance of each of said conductors, $Z_M$ is the average mutual impedance of the effective inductive couplings between any two of said certain conductors and $Z_G$ is the sum of the resistive and inductive components of the common impedance in said signal return conductor; and means to reduce crosstalk interference in the system comprising a negative impedance network inserted in said signal return conductor providing in series therewith an inductive impedance substantially equal to $-Z_M$ and another impedance substantially equal to $-Z_G$, for effectively canceling the magnetic and resistive parameters of the unbalanced cable circuit.

References Cited in the file of this patent

UNITED STATES PATENTS

| | | |
|---|---|---|
| 2,159,927 | Cannon | May 23, 1939 |
| 2,466,629 | Weaver | Apr. 5, 1949 |